(12) United States Patent
Baron et al.

(10) Patent No.: US 9,873,475 B2
(45) Date of Patent: Jan. 23, 2018

(54) SKI SCOOTER

(71) Applicant: SMART TRIKE MNF PTE LTD., Singapore (SG)

(72) Inventors: Yoram Baron, Moshav Nir Israel (IL); Gil Nachmany, Pardes Hanna-Karkur (IL); Alexey Rubinchik, Holon (IL)

(73) Assignee: Smart Trike MNF PTE LTD., Singapore (SG)

( * ) Notice: Subject to any disclaimer, the term of this patent is extended or adjusted under 35 U.S.C. 154(b) by 0 days.

(21) Appl. No.: 15/312,121

(22) PCT Filed: Jul. 7, 2015

(86) PCT No.: PCT/IB2015/055138
§ 371 (c)(1),
(2) Date: Nov. 17, 2016

(87) PCT Pub. No.: WO2016/005907
PCT Pub. Date: Jan. 14, 2016

(65) Prior Publication Data
US 2017/0088224 A1 Mar. 30, 2017

Related U.S. Application Data

(60) Provisional application No. 62/022,731, filed on Jul. 10, 2014.

(51) Int. Cl.
*B62K 5/10* (2013.01)
*B62K 21/12* (2006.01)
(Continued)

(52) U.S. Cl.
CPC ............... *B62K 5/10* (2013.01); *B62K 5/02* (2013.01); *B62K 5/06* (2013.01); *B62K 19/18* (2013.01);
(Continued)

(58) Field of Classification Search
CPC ... B62K 5/10; B62K 5/02; B62K 5/06; B62K 3/002; B62M 1/00
See application file for complete search history.

(56) References Cited

U.S. PATENT DOCUMENTS 4,087,106 A * 5/1978 Winchell ............... B62B 13/12
180/183
4,087,108 A * 5/1978 Winchell ............... B62K 3/002
180/208
(Continued)

FOREIGN PATENT DOCUMENTS

CN 2649468 Y 10/2004
CN 200957872 Y 10/2007
(Continued)

OTHER PUBLICATIONS

International Search Report for PCT/IB2015/055138, dated Oct. 8, 2015, 4 pages.
(Continued)

*Primary Examiner* — Anne Marie M Boehler
*Assistant Examiner* — Michael B Stabley
(74) *Attorney, Agent, or Firm* — Roach Brown McCarthy & Gruber, P.C.; Kevin D. McCarthy

(57) ABSTRACT

The present invention relates to a scooter having revolving footboards comprising: a head tube; a stem rotatbly held in said head tube; a fork connected to the lower end of said stem; at least one front wheel rotatably connected to said fork of said stem; a handle connected to the upper end of said stem; two rear tubes connected to said head tube; two swivel rear wheels, where each of said swivel wheels is pivotally connected to the rear of one of said rear tubes; and at least two revolving footboards which are rotatably connected on said rear tubes.

13 Claims, 4 Drawing Sheets

(51) Int. Cl.
*B62K 5/06* (2006.01)
*B62K 5/02* (2013.01)
*B62M 1/00* (2010.01)
*B62K 23/06* (2006.01)
*B62K 19/18* (2006.01)
*B62K 19/20* (2006.01)
*B62K 19/24* (2006.01)

(52) U.S. Cl.
CPC .............. *B62K 21/12* (2013.01); *B62K 23/06* (2013.01); *B62M 1/00* (2013.01); *B60Y 2410/124* (2013.01); *B62K 19/20* (2013.01); *B62K 19/24* (2013.01)

(56) References Cited

U.S. PATENT DOCUMENTS

| | | | | |
|---|---|---|---|---|
| 4,123,079 | A * | 10/1978 | Biskup | B62K 3/002 280/11.28 |
| 4,165,093 | A * | 8/1979 | Biskup | B62K 3/002 280/220 |
| 6,220,612 | B1 * | 4/2001 | Beleski, Jr. | B62K 3/002 280/40 |
| 6,719,310 | B1 * | 4/2004 | Lin | B62M 1/24 280/62 |
| 6,908,090 | B2 * | 6/2005 | Chuang | B62K 21/00 280/62 |
| 6,908,091 | B2 * | 6/2005 | Chuang | B62K 3/002 280/62 |
| 6,991,242 | B2 * | 1/2006 | Teng | B62K 3/002 280/87.041 |
| 7,549,655 | B2 * | 6/2009 | Fan | B62K 3/002 280/87.041 |
| 7,597,334 | B2 * | 10/2009 | Chen | B62K 3/002 280/62 |
| 8,328,209 | B2 * | 12/2012 | Tsai | B62K 3/002 280/87.042 |
| 8,505,945 | B2 * | 8/2013 | Chen | B62K 3/002 280/220 |
| 8,807,581 | B2 | 8/2014 | Liao | |
| 2002/0063406 | A1 * | 5/2002 | Feng | B62K 3/002 280/87.041 |
| 2005/0001399 | A1 * | 1/2005 | Yeo | B62K 3/002 280/87.041 |
| 2005/0082778 | A1 * | 4/2005 | Chuang | B62M 1/24 280/87.041 |
| 2007/0170686 | A1 | 7/2007 | Chen | |
| 2011/0031709 | A1 | 2/2011 | Kim | |
| 2013/0257013 | A1 | 10/2013 | Liao | |

FOREIGN PATENT DOCUMENTS

| | | |
|---|---|---|
| CN | 200960970 Y | 10/2007 |
| CN | 201647021 U | 11/2010 |
| CN | 202657178 U | 1/2013 |
| WO | 2007/063567 A1 | 6/2007 |

OTHER PUBLICATIONS

Written Opinion of the International Searching Authority for PCT/IB2015/055138, dated Oct. 8, 2015, 4 pages.

\* cited by examiner

SKI SCOOTER

TECHNICAL FIELD

The present invention relates to riding vehicles. More particularly, the present invention relates to scooter vehicles.

BACKGROUND

As of today, scooters are widely used for transportation and recreation, by children and adults alike. The presently available scooters can be divided into 2 main categories: passive driven scooters and active driven scooters. The passive driven scooters are typically designed to roll downhill or to be driven by kicking the ground and pushing the scooter. On the other hand, the active driven scooters are typically designed to drive forwards based on some kind of energy transformation which transfers the rider's exercise power into forward movement. The active scooters category may be divided into 2 sub-categories: the 2-wheels scooters and the 3 (or more)-wheels scooters, where the 3-wheels scooters are typically more stable, and can typically stand upright on the floor by themselves.

One type of a 3 wheel scooter has one front wheel and two rear wheels set in a reversed "V" formation. The front of the scooter may have a head tube where the head tube holds a stem that can rotate within boundaries, clockwise or counterclockwise. The stem has a front wheel connected to its lower end and a handle installed on its upper end. The handle can swing left and right for turning the front wheel left and right for, inter alia, steering the scooter. Both sides of the scooter each have a tube that extends from the head tube. The two tubes are stretched outward in a predetermined angle and one swivel rear wheel is provided at the rear end of each tube. In addition to the fact, that the handle can be used to steer the scooter, the handle can also be used to swing the rear of the scooter left and right, in relations to: the stem, handle, and front wheel. The swinging of the rear of the scooter left and right causes the scooter to glide forward together with a rear S-shaped movement.

CN201647021 discloses a three-wheel scooter, which comprises a handle, a stand pipe, a front wheel, a folding complex, a left and right leg pipe, a fork assembly, a back wheel, a brake gear and a foot treadle, wherein the ends of the left and right leg pipe are respectively provided with a connecting base. The fork assembly comprises a back wheel fork, a hollow connecting shaft, a bearing and a bearing pressing plate. The hollow connecting shaft can be rotatably arranged on the back wheel fork through the bearing and the bearing pressing plate. The back wheel can be rotatably arranged on the back fork, and the hollow connecting shaft is fixed on the connecting base in an inclined way at an included angle of 64 to 66 degrees with the horizontal plane. Nevertheless, the riding of the disclosed three-wheel scooter is inefficient.

U.S. Ser. No. 13/849,151 discloses a head tube reset mechanism for a scooter that includes a connector, for installing rear wheels, and a head tube, for installing a front wheel and a handle. The front end of the connector is a jacket tube and a filling slot keeping a predetermined spacing from the jacket tube. The head tube includes a pivot sheathing into the jacket tube and a limiting unit extending into the filling slot. As disclosed, an elastomer is installed between the filling slot of the connector and the limiting unit. The handle and the front wheel on the head tube swing left and right against the pivot along with the head tube, when the scooter glides forward. Nevertheless, the riding of the disclosed three-wheel scooter is cumbersome.

CN202657178U discloses a three-wheeled scooter, wherein a front fork is installed on the lower portion of a handle bar stem, a front wheel is located on the front fork, footboards and rear wheels are installed on the rear end of a connecting rod, the footboards are hinged on a folding frame through the connecting rod, one end of a folding rod is connected with the front fork, the other end of the folding rod is hinged with the folding frame, a folding rod installation part is installed on the folding frame, a locking screw is installed on the folding rod, and the folding rod installation part is provided with a screw hole corresponding with the screw. The scooter is provided with a braking device. The three-wheeled scooter is characterized in that the braking device comprises a brake crank, wherein braking lines are connected with the brake crank, the front end and the rear end of the connecting rod are respectively provided with openings used for the braking lines passing in and out, the rear end of the braking lines are connected with brake blocks which are fixed on rear wheels frames through spindles, and the brake blocks can turn along the spindles. Because the front end and the rear end of the connecting rod are respectively provided with openings used for the braking lines passing in and out, part of the braking lines are enabled to be hidden in the connecting rod, and thus the effect on the braking lines during the use process can be reduced. Brake blocks are fixed on rear wheels frames through the spindles, and the brake blocks can turn along the spindles. Therefore when braking is needed, the braking lines can be pulled to enable the brake blocks to turn along the spindles and thus braking can be achieved. Nevertheless, the riding of the disclosed three-wheel scooter is tiresome.

It would therefore be desired to propose a system void of these deficiencies.

SUMMARY

It is an object of the present invention to provide a scooter that is comfortable to ride continually.

It is another object of the present invention to provide a scooter which provides a ski like gliding experience.

It is another object of the present invention to provide a scooter for exercise and entertainment which is faster, enjoyable and more effective on extreme riding.

Other objects and advantages of the invention will become apparent as the description proceeds.

The present invention relates to a scooter having revolving footboards comprising: a head tube; a stem rotatably held in said head tube; a fork connected to the lower end of said stem; at least one front wheel rotatably connected to said fork of said stem; a handle connected to the upper end of said stem; two rear tubes connected to said head tube; two swivel rear wheels, where each of said swivel wheels is pivotally connected to the rear of one of said rear tubes; and at least two revolving footboards, where each of said footboards is rotatably connected on to at least one of said rear tubes.

Preferably, the revolving footboards may be rotationally locked.

In one embodiment, the footboards have a restrictor for restricting the rotation of the footboards within certain boundaries.

In one embodiment, the footboards may have regulating spring, to keep them returning to a predefined angle.

Preferably, the rear tubes may be folded.

Preferably, the base holders of the revolving footboards and top holders of the revolving footboards are unevenly cut for creating a skiing effect when turning right and left.

BRIEF DESCRIPTION OF THE DRAWINGS

The accompanying drawings, and specific references to their details, are herein used, by way of example only, to illustratively describe some of the embodiments of the invention.

In the drawings.

DETAILED DESCRIPTION

The terms of "front", "rear", "down", "up", "bottom", "upper", "horizontal", "vertical", "right", "left" or any reference to sides or directions are used throughout the description for the sake of brevity alone and are relative terms only and not intended to require a particular component orientation.

Figure 1:
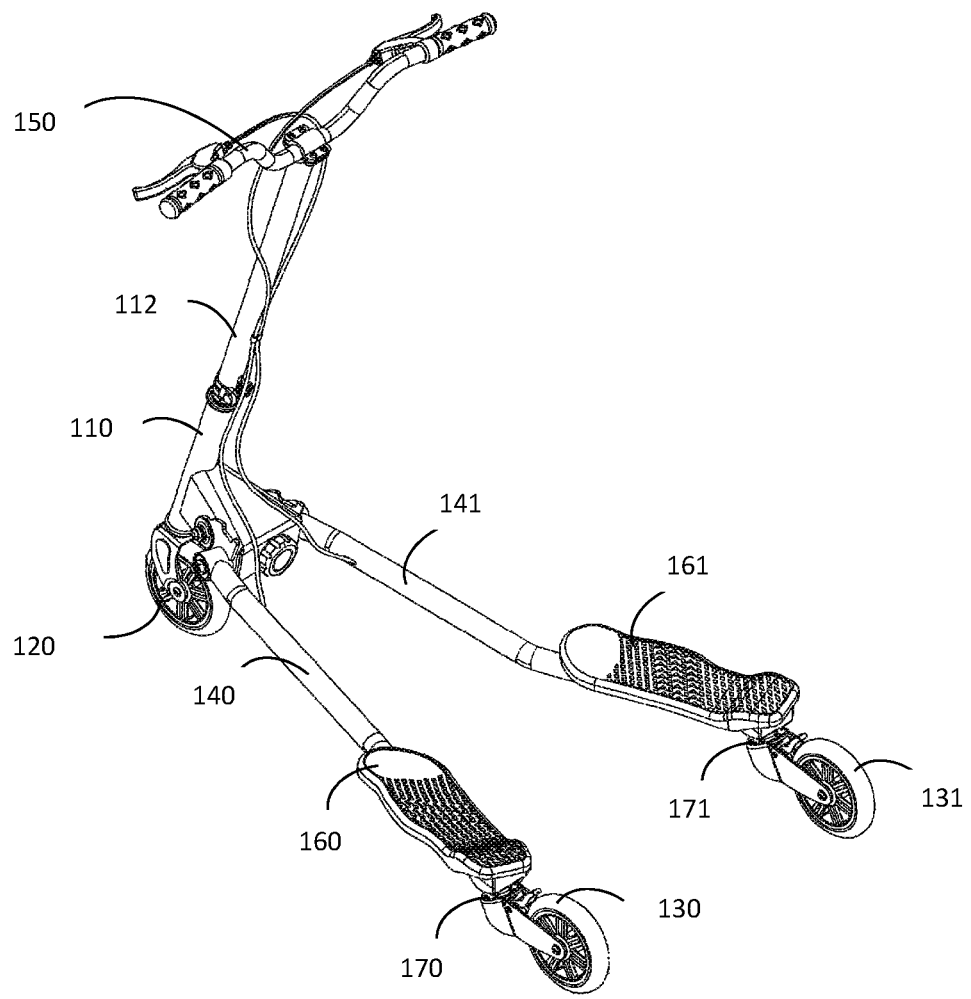
FIG. 1 is a diagram of a prior art 3-wheel scooter.

FIG. 1 is a diagram of a prior art 3-wheel scooter. The depicted 3-wheel scooter has a head tube 110 which holds a stem 112 that can rotate freely within the head tube 110. The stem 112 has a front wheel 120 connected to its lower end and a handle 150 installed on its upper end. Two tubes 140 and 141 extend rearward and outward in a predetermined angle, and two swivel rear wheels 130 and 131 are pivotally attached at the rear of the tubes 140 and 141 respectively. The swivel rear wheels 130 and 131 are pivotally attached to the tubes 140 and 141 respectively with the swinging axels 170 and 171 respectively for allowing rear wheels 130 and 131 to swing left and right. The rider may glide the scooter forward by standing on the footboards 160 and 161 while holding the handle 150 and swinging the rear of the scooter left and right in an S-shaped route, in relations to the front wheel 120. The effect of swinging the rear of the scooter left and right causes the swivel rear wheels 130 and 131 to swing left and right, on their respective swinging axels 170 and 171, therefore, due to this configuration's intrinsic characteristics, the swinging left and right causes the rear wheels 130 and 131 angular movement to push the scooter forward when swung from side to side. In addition, the handle 150 can also be used for turning the front wheel 120 left and right for effectively steering the scooter. Nevertheless, when the user swings the rear of the scooter left and right his feet and legs are required to bend left and right as his feet stand on the static footboards 160 and 161 which are interconnected to the tubes 140 and 141.

Figure 2:
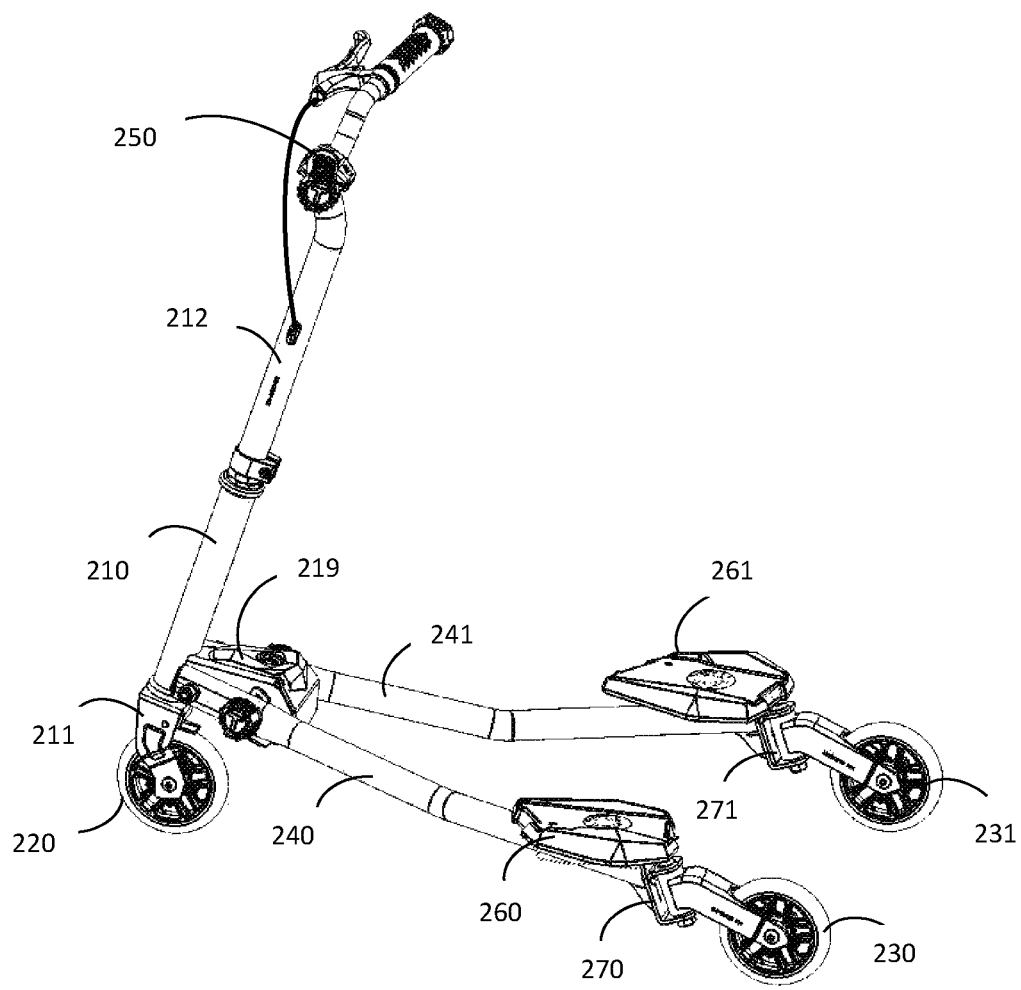
FIG. 2 is a diagram of a 3-wheel scooter having revolving footboards, according to an embodiment of the invention.

FIG. 2 is a diagram of a 3-wheel scooter having revolving footboards, according to an embodiment of the invention. In this embodiment, the scooter has revolving footboards 260 and 261 which are rotatably connected to rear tubes 240 and 241 respectively for allowing the rider to turn his feet comfortably left or right when riding the scooter. The revolving mechanism of the footboards 260 and 261 is described in greater detail later in relations to FIG. 3.

In FIG. 2, the depicted scooter may have a head tube 210 which may rotatably hold a stem 212. Thus the stem 212 may rotate freely, clockwise or counterclockwise, within the head tube 210, while being rotatably held in the head tube 210. The stem 212 may have a fork 211 connected to its lower end, where the fork may rotatably hold the front wheel 220. In one embodiment, the fork 211 may hold the center axle of the front wheel 220 thus allowing the front wheel to rotate freely. A handle 250 may be connected to the upper end of stem 212. The handle 250 may also be used by a rider for rotating the stem 212 clockwise or counterclockwise thus turning the front wheel right or left. Two tubes 240 and 241 may be connected to the two sides of the head tube 210 directly or indirectly. The rear tubes 240 and 241 may be connected directly to the head tube 210 by a screw, welding, or any other connecting method, or indirectly by connecting the rear tubes 240 and 241 to a structure, such as structure 219, using any known connecting means such as screws, where the structure may be connected to the head tube 210 using any known connecting means such as welding.

In FIG. 2, the left wheel 230 may be pivotally connected to the rear of the left rear tube 240 using axle 270, according to an embodiment. The axle 270, which allows the turning of rear wheel 230 left or right, is located at a distance from the center axle of the left wheel 230 in order to create the "swivel wheel effect", sometimes known as the caster wheel effect, where the wheel 230 can trail the turning of the rear tube 240 left or right. The right wheel 231 may be pivotally connected to the rear of the right rear tube 241 using axle 271, in a similar swivel wheel effect where the wheel 231 can trail the turning of the rear tube 241 left or right.

The rider may glide the scooter, described in relations to FIG. 2, forward by standing on the footboards 260 and 261 while holding the handle 250 and swinging the rear of the scooter left and right, in relations to the front wheel 220, in an S-shaped route. The effect of swinging the rear of the scooter left and right causes the swivel rear wheels 230 and 231 to rotatably swing left and right, therefore, due to the swivel wheel intrinsic characteristics the swinging left and right causes the rear wheels to push the scooter forward when swung from side to side.

In one embodiment, the axles 270 and 271, of the scooter described in relations to FIG. 2, may be positioned in an angle where each of the axes of the axles forms a sharp angle with the ground. The sharp angles of the axels 270 and 271 may contribute to the forward movement of the scooter as each turning of left and right of the each of the swivel wheels 230 and 231 while applying weight pressure on the axles 270 and 271 causes the pressure and the turning to convert to forward movement. For example, if the rider turns the rear of the scooter right by pushing the footboard 260, the footboard 260 pulls the rear tube 240 right which pulls the axel 270 right. Thus, when the axel 270 is pulled right the rear wheel 230 follows right, however, since the axel 270 is positioned in a sharp angle the axel 270 rises effectively causing the rear tube 240 to rise. Nevertheless, if at this stage the rider is still standing on the footboard 260, then his weight pressures the footboard downwards, however, since the wheel 230 is actually following right, at this stage, the weight pressure causes the rear wheel 230 to turn straight, effectively pushing the tube 240, and the rest of the scooter, forward. In one embodiment, the sharp angles of the axels 270 and 271 may be in relations to the front of the scooter and/or in relations to themselves, meaning that the axels 270 and 271 may be unparalleled to each other.

In one embodiment, rotation of the handlebar 250 may also be used for the movement of the scooter forward due to the angle of the fork 211 of the front wheel 220 in relations to the head tube 210, for example, turning the front wheel 220 right and left will cause the scooter to move forward.

The handle 250 can also be used for turning the front wheel 220 left and right for effectively steering the scooter as well, as described in relations to FIG. 2.

In one embodiment, the swivel wheels 230 and 231, of the scooter described in relations to FIG. 2, may be connected with springs to the rear tubes 240 and 241 respectively, and the rear tubes 240 and 241 may have front vertical hinges for allowing a scissors movement of the tubes 240 and 241. Thus when the user moves the tubes 240 and 241 in a scissors like movement, where the tubes 240 and 241 are moved together and apart, the scooter may move forward accordingly. Thus, in this embodiment, the scooter may have revolving footboards 260 and 261 which are rotatably connected to rear tubes 240 and 241 respectively for allowing the rider to turn his feet comfortably left or right when riding the scooter and moving the tubes 240 and 241 together and apart in a scissors like movement.

Figure 3:
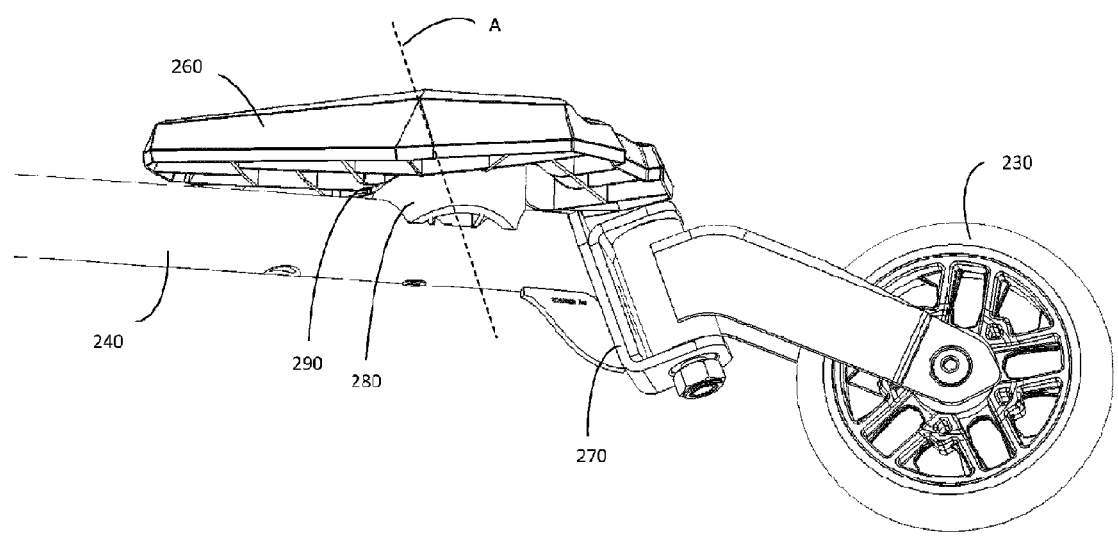
FIG. 3 is a diagram of the revolving footboard mechanism, according to an embodiment of the invention.

FIG. 3 is a diagram of the revolving footboard mechanism, according to an embodiment of the invention. For the sake of brevity a description is set forth for the left revolving footboard mechanism, however, the right revolving footboard mechanism may work in similarly the same way. The revolving footboard 260 may sit on axis A, where its base holder 280 may be connected to the tube 240 by a screw or any other connecting means. The revolving mechanism may comprise two parts, base holder 280 and top holder 290, which may be rotatably connected within, which revolve one on top of the other for creating a footboard revolving effect for the rider. In one embodiment, a ball bearing or a number of balls may be placed, between the base holder 280 and top holder 290, for the swift revolving of the footboard 260 about axis A. In one embodiment the base holder 280 and top holder 290 are unevenly cut for creating a skiing effect when the footboard 260 revolves right and left. For example, the top of base holder 280 and the bottom of top holder 290 may both be cut in angle of about 15° in relations to the ground. Thus when the user swings the rear of the scooter left and right, for gliding the scooter forward, his left foot can move left and right, up and down, with the footboard 260 similar to the foot movement of a ski glider when gliding left and right on snow. Accordingly, his right foot may also move left and right with the corresponding footboard when the rear of the scooter swings left and right when gliding the scooter forward. In another embodiment, the angles of the cutting of the base and top holders (280, 290) may be different from one another.

In one embodiment the two footboards may have a restrictor for restricting the revolving of the footboards within certain boundaries.

In one embodiment the revolving footboards may have a lock, for selectively rotationally locking the footboards in a certain angle, and unlocking the footboards for revolving.

Figure 4:
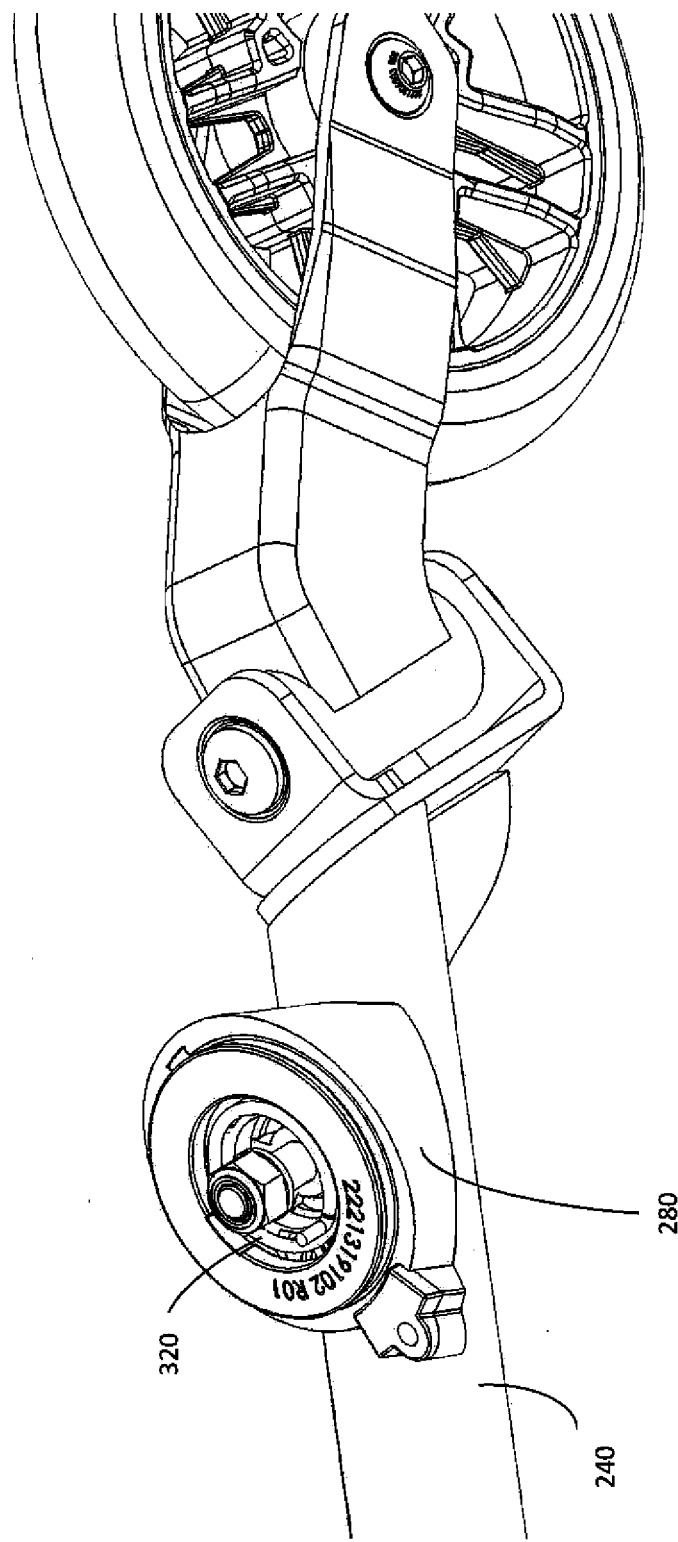
FIG. 4 is a diagram of the base holder, of the footboard mechanism, with a regulating spring, according to an embodiment of the invention.

In one embodiment the footboards may have regulating spring(s), such as spring 320 depicted at FIG. 4, to keep them returning to a predefined angle.

In one embodiment the tubes 240 and 241, as described in relations to FIG. 2, may be folded towards the head tube 210 for easy carrying or storage. The tubes 240 and 241 may be connected to the head tube 210 by a screw or an axle which may allow the folding of the tubes. The folding mechanism may also have a lock for locking the tubes in perpendicular when riding and for unlocking the tubes for folding.

While the above description discloses many embodiments and specifications of the invention, these were described by way of illustration and should not be construed as limitations on the scope of the invention. The described invention may be carried into practice with many modifications which are within the scope of the appended claims.

The invention claimed is:

1. A scooter having revolving footboards comprising:
   a head tube;
   a stem rotatably held in said head tube;
   a fork connected to the lower end of said stem;
   at least one front wheel rotatably connected to said fork of said stem;
   a handle connected to the upper end of said stem, for steering said scooter;
   two rear tubes connected to said head tube;
   two swivel rear wheels, where each of said swivel wheels is pivotally connected to the rear of one of said rear tubes;
   at least two revolving footboards, where each of said footboards is rotatably connected to one of said rear tubes by a revolving mechanism, where each revolving mechanism comprises at least two parts: a base holder and a top holder; and
   wherein at least one of said base holder and said top holder of the revolving footboards are unevenly cut for creating a skiing effect when turning right and left.

2. A scooter according to claim 1, where the revolving footboards may be rotationally locked.

3. A scooter according to claim 1, where the footboards have a restrictor for restricting the rotation of the footboards within certain boundaries.

4. A scooter according to claim 1, where the footboards may have a regulating spring, to keep returning said footboards to a predefined angle.

5. A scooter according to claim 1, where the rear tubes may be folded.

6. A scooter having revolving footboards comprising:
   a head tube;
   a stem rotatably held in said head tube;
   a fork connected to the lower end of said stem;
   at least one front wheel rotatably connected to said fork of said stem;
   a handle connected to the upper end of said stem;
   two foldable rear tubes connected to said head tube;
   at least two revolving footboards, where each of said footboards is rotatably connected to one of said rear tubes by a revolving mechanism, where each revolving mechanism comprises at least two parts: a base holder and a top holder; and
   wherein at least one of said base holder and said top holder of the revolving footboards are unevenly cut for creating a skiing effect when turning right and left.

7. A scooter according to claim 6, where the revolving footboards may be rotationally locked.

8. A scooter according to claim 6, where the footboards have a restrictor for restricting the rotation of the footboards within certain boundaries.

9. A scooter according to claim 6, where the footboards may have a regulating spring, to keep returning said footboards to a predefined angle.

10. A scooter having revolving footboards comprising:
    a head tube;
    a stem rotatably held in said head tube;
    a fork connected to the lower end of said stem;
    at least one front wheel rotatably connected to said fork of said stem;
    a handle connected to the upper end of said stem;
    two rear tubes connected to said head tube;

two swivel rear wheels, where each of said swivel wheels is pivotally connected to the rear of one of said rear tubes;

at least two revolving footboards, where each of said footboards is rotatably connected to one of said rear tubes by a revolving mechanism, where each revolving mechanism comprises at least two parts: a base holder and a top holder; and wherein at least one of said base holder and said top holder of the revolving footboards are unevenly cut for creating a skiing effect when turning right and left.

11. A scooter according to claim 10, where the revolving footboards may be rotationally locked.

12. A scooter according to claim 10, where the footboards have a restrictor for restricting the rotation of the footboards within certain boundaries.

13. A scooter according to claim 10, where the rear tubes may be folded.

\* \* \* \* \*